T. Z. COLE.
Excavator.

No. 166,852.      Patented Aug. 17, 1875.

WITNESSES.
J. Wm Garners
H. C. Scott

INVENTOR.
Thos. Z. Cole,
per
F. A. Lehmann, Atty.

UNITED STATES PATENT OFFICE.

THOMAS Z. COLE, OF GALVESTON, TEXAS, ASSIGNOR OF ONE-FOURTH HIS RIGHT TO JOHN E. WALTON, OF SAME PLACE.

IMPROVEMENT IN EXCAVATORS.

Specification forming part of Letters Patent No. 166,852, dated August 17, 1875; application filed July 29, 1875.

*To all whom it may concern:*

Be it known that I, THOS. Z. COLE, of Galveston, in the county of Galveston and State of Texas, have invented certain new and useful Improvements in Dredging and Excavating Machines; and I do hereby declare the following to be a full, clear, and exact description of the invention, such as will enable others skilled in the art to which it pertains to make and use it, reference being had to the accompanying drawings, which form part of this specification.

My invention relates to an improvement in excavating and dredging machines; and it consists in the arrangement and combination of devices that will be more fully described hereinafter, whereby each one of the buckets is freed or cleaned of its load by means of a revolving fan.

Figure 1:
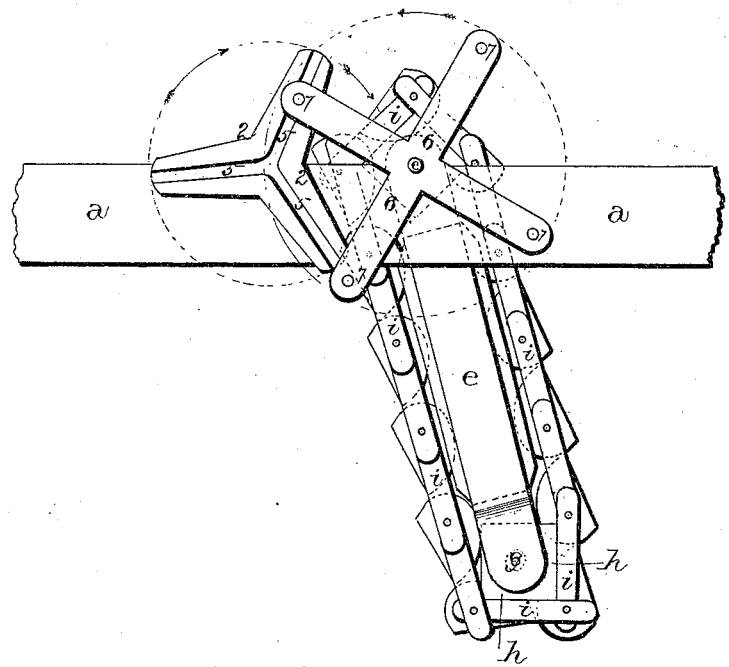
Figure 2:
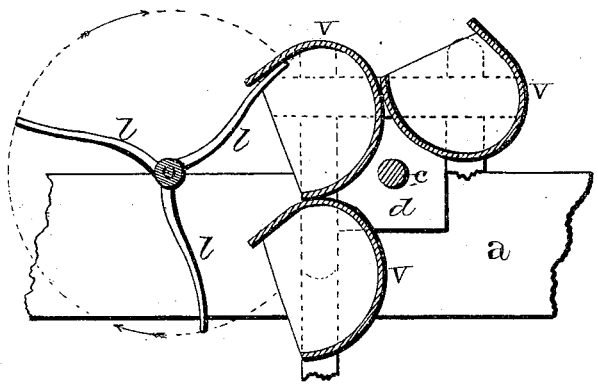
Figure 3:
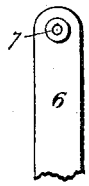

Figure 1 is a side elevation of my invention. Figs. 2 and 3 are detail views of the same.

$a$ represents a frame of any suitable construction, upon which is journaled the shaft $c$, and to which shaft are secured the two square blocks or cams $d$, over which the chain passes. Pivoted upon this shaft $c$ are the two plates or bars $e$, which form the frame for the buckets to travel around, and in the lower ends of which are journaled the shaft $g$, that is also provided with two square blocks or cams, $h$. These lower blocks are so placed as to always be at an oblique angle to the upper ones, thereby making the buckets dig better, and equalizing the length of the chain. The buckets $v$ are attached to the long links $i$, and are so shaped as to be rounding at their bottoms, vertical at their rear sides, and a little slanting at their front ones. They are made of this shape so that as they reach the blocks $d$, and are vertical with their faces, one of the wings of the fan $l$ enters the bucket, and as the bucket moves forward the wing forces out the whole load contained therein. This fan is placed upon the shaft $o$, and upon each end of the shaft is placed a three-armed cam, 2, in the outer faces of which are cut the three grooves 5, each one of which radiates from the center. Upon each end of the shaft $c$ is placed a cross, 6, each of the arms of which, at its outer end, has a projection or stud, 7, which enters the grooves in the tripods and forces them around. The arms of the cross are so placed that each one stands at right angles to one of the faces of the cams, and the three-armed cam is so arranged in relation to the cross that, as the pin or projection 7 of one arm is about to enter one of the grooves 5, the projection or pin of the other arm is about to leave the other groove.

In some sections the sand and soil are of such a nature as to stick to or in the buckets in such a manner that, were not the cleaning-fan used, the buckets would be useless.

Having thus described my invention, I claim—

The combination of the cross 6, three-armed cam 2, chain of buckets, and fan $l$, as set forth.

In testimony that I claim the foregoing I have hereunto set my hand this 28th day of July, 1875.

T. Z. COLE.

Witnesses:
F. A. LEHMANN,
THOS. COCHRANE.